US008607644B2

(12) United States Patent
Hussain et al.

(10) Patent No.: US 8,607,644 B2
(45) Date of Patent: Dec. 17, 2013

(54) CORIOLIS MASS FLOWMETER

(75) Inventors: Yousif Hussain, Weston Favell (GB); Tao Wang, Canterbury (GB)

(73) Assignee: Krohne AG, Basel (CH)

( * ) Notice: Subject to any disclaimer, the term of this patent is extended or adjusted under 35 U.S.C. 154(b) by 166 days.

(21) Appl. No.: 13/176,487

(22) Filed: Jul. 5, 2011

(65) Prior Publication Data

US 2012/0079891 A1 Apr. 5, 2012

(30) Foreign Application Priority Data

Oct. 4, 2010 (DE) .......................... 10 2010 047 241

(51) Int. Cl.
*G01F 1/84* (2006.01)

(52) U.S. Cl.
USPC .................................................. 73/861.357

(58) Field of Classification Search
USPC ................. 73/861.357, 861.356, 861.355
See application file for complete search history.

(56) References Cited

U.S. PATENT DOCUMENTS

| | | | | |
|---|---|---|---|---|
| 5,048,349 A | * | 9/1991 | Wolff | ........................ 73/861.357 |
| 7,127,952 B2 | * | 10/2006 | Bitto et al. | ................ 73/861.355 |
| 7,350,422 B2 | | 4/2008 | Bitto et al. | |
| 7,946,187 B2 | * | 5/2011 | Hussain et al. | ........... 73/861.357 |
| 8,333,119 B2 | * | 12/2012 | Anklin-Imhof et al. | . 73/861.357 |
| 2010/0031755 A1 | | 2/2010 | Bitto et al. | |
| 2010/0251830 A1 | | 10/2010 | Bitto et al. | |
| 2011/0146383 A1 | | 6/2011 | Bitto et al. | |
| 2011/0146416 A1 | | 6/2011 | Bitto et al. | |
| 2011/0259123 A1 | | 10/2011 | Bitto et al. | |

FOREIGN PATENT DOCUMENTS

WO 96/08697 A2 3/1996

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A Coriolis mass flowmeter having at least four measuring tubes running parallel, the measuring tubes being joined in pairs into a oscillation unit by being inserted in openings in a holding device (1) and wherein at least part of either a sensor or actuator device is attached to the holding device (1). A Coriolis mass flowmeter that has an increased measuring accuracy is implemented in that the measuring tube central axes (3) of a measuring tube pair span a common plane (E), that the holding device (1) has at least two attachment extensions (4), that the attachment extensions (4) extend across the common plane (E) and that the holding devices (1) with the attachment extensions (4) are mirror symmetric relative to the common plane (E) in respect to their projection viewed in the direction of the measuring tube central axes (3).

11 Claims, 3 Drawing Sheets

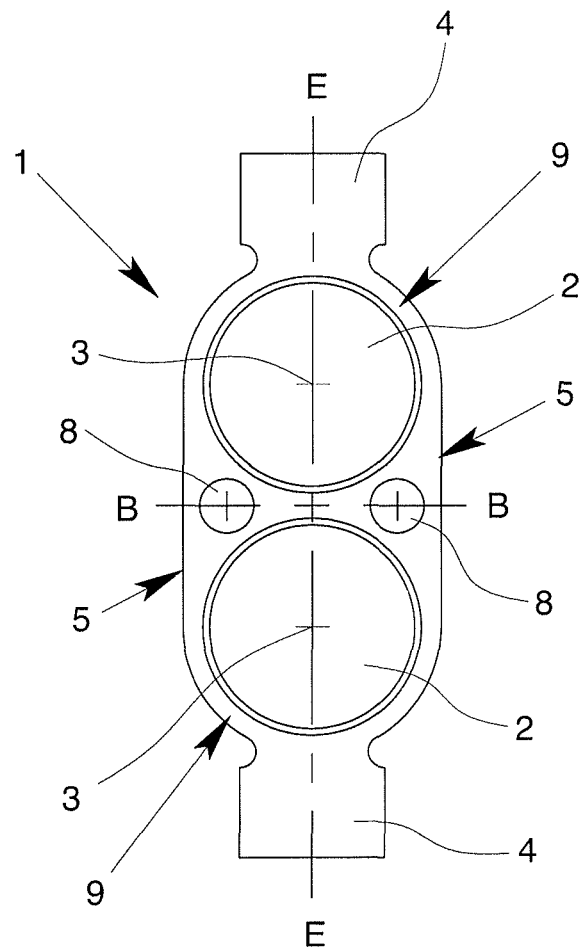
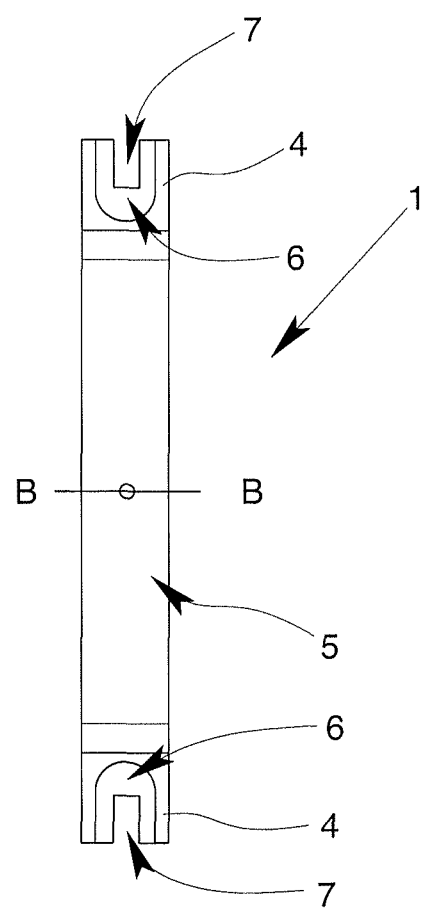
Fig. 2    Fig. 3
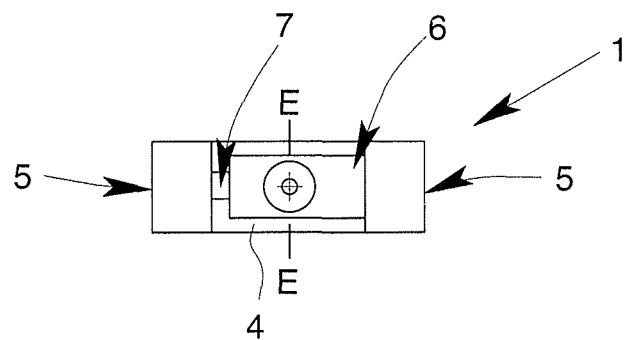
Fig. 4

CORIOLIS MASS FLOWMETER

BACKGROUND OF THE INVENTION

1. Field of the Invention

The invention relates to a Coriolis mass flowmeter having at least four measuring tubes running parallel, wherein the measuring tubes are joined in pairs into an oscillation unit by at least one holding device, wherein the measuring tubes are inserted in openings in the holding device and wherein at least part of either a sensor or an actuator device is attached to the holding device.

2. Description of Related Art

Mass flowmeters that function according to the Coriolis principal generally have at least one actuator device with which the measuring tube or the oscillation units are excited to oscillation as well as normally two sensor devices, with which the desired oscillation or the desired oscillations of the measuring tube is/are detected. The sensor devices are normally mounted to the oscillation units on the input and output sides. Without flow, both signals have essentially the same phase. During mass flow, a phase shift of both signals results from the different Coriolis forces during feed and discharge, which is proportional to the mass flow so that this can be determined by the phase shift.

The actuator device and the sensor device are normally arranged in such a manner that they, for example, have a permanent magnet as well as a magnet coil, in order to transfer oscillations to the measuring tube electrically—action of force—or to detect oscillations of the measuring tube—inductive effect. The applicant knows of mass flowmeters with four measuring tubes from practice, in which each two measuring tubes are joined to an oscillation unit with at least one holding device, which are excited to oscillation by an actuator device. The known Coriolis mass flowmeters, however, have the disadvantage that the measuring tubes of an oscillation unit do not oscillate only in relation to the other oscillation units, but the measuring tubes of an oscillation unit can also oscillate in relation to one another, through which the measurements of the Coriolis mass flowmeter are negatively influenced.

SUMMARY OF THE INVENTION

Based on the above-mentioned prior art, the invention seeks to provide a Coriolis mass flowmeter that has an increased measurement accuracy.

The object is surprisingly met by a Coriolis mass flowmeter of such type in that the measuring tube central axes of a measuring tube pair span a common plane, that the holding device has at least two attachment extensions, that the attachment extensions extend into the common plane and that the holding devices with the attachment extensions are mirror symmetric to the common plane in respect to their projection view in the direction of the measuring tube central axes.

Consequently, the Coriolis mass flowmeter preferably comprises four measuring tubes running parallel to one another, of which two are joined together to an oscillation unit by at least one holding device. Preferably, a total of three holding devices are attached to each two measuring tubes of an oscillation unit, wherein one of the holding devices carries parts of the actuator device and the two further holding devices carry parts of the sensor devices. The holding devices have openings for the measuring tubes so that the holding devices can be pushed onto the measuring tubes to be joined and are connected to the measuring tubes, for example, by means of a welded connection. The holding devices are designed in such a stable manner that oscillations of the two measuring tubes joined together as an oscillation unit in relation to one another are prevented by the holding devices.

Both measuring tubes held in a holding device span a common plane with their measuring tube central axes running parallel to one another, in which, consequently, both measuring tube central axes run. Two attachment extensions are arranged opposite each other on the holding device—on both sides of the holding device—that extends into the common plane. When, for example, the measuring tubes in the holding device are arranged on top of one another, one attachment extension is located above the measuring tubes and one attachment extension is below the measuring tubes.

That the attachment extensions extend into the plane only means that at least a part of one of the attachment extensions is sliced by the common plane E or lies within the common plane. The attachment extensions are thus arranged in such a manner that the measuring tubes are positioned between both attachment extensions and the attachment extensions extend symmetrically relative to the measuring tubes.

Parts of a sensor or actuator device can be attached to the attachment extensions. "Part of a sensor or actuator device" means that only a first part of a sensor or actuator device is attached to an attachment extension. A complete sensor or actuator device for the operation of a Coriolis mass flowmeter first occurs through the interaction of two oppositely situated parts of a sensor or actuator device, for example, of a permanent magnet and a coil, which interact during operation with the function of a sensor device or an actuator device. Consequently, this means that when a holding device is attached to an oscillation unit of two measuring tubes, which carries a respective part of a sensor or actuator device above and below the measuring tubes, that a second holding device is attached to the second oscillation unit, which is formed by the second measuring tube pair, opposite the first holding device, which carries the corresponding second parts of a sensor or actuator device. The first and second parts of a sensor or actuator device on the first and second holding devices can then interact with one another during operation of the Coriolis mass flowmeter in order to bring the measuring tubes into oscillation or in order to detect the oscillations of the measuring tubes.

In respect to their components, a sensor device and an actuator device are normally designed in a manner, in which the components for exciting the measuring tube to oscillation are used in an actuator device, while identical components for detecting the oscillation are used in the sensor device. This means that an actuator device can be essentially used as a sensor device or a sensor device can essentially be used as an actuator device. The use of each component can, for example, also be switched during operation of the measuring device, so that the component is initially used to excite the oscillation and then to detect the oscillation.

"Sensor—or actuator device" is not to be solely understood, and thus, does not mean that only parts of a sensor device or only parts of an actuator device should be attached to a holding device, but also that a holding device can carry a sensor device on one attachment extension and an actuator device on another attachment extension. Preferably, two first parts of a sensor or actuator device are attached to a holding device, while the oppositely arranged holding device carries the corresponding second parts. The attachment extensions have receiving areas for receiving the parts of a sensor or actuator device.

The holding devices with the attachment extensions have the particular advantage that they, in respect to their projection view, are designed in a mirrored symmetry to the common plane in the direction of the measuring tube central axes. This essentially means that the basic form of a holding device with the attachment extensions is in mirrored symmetry to the common plane in the direction of the measuring tube central axes. The holding device with the attachment extensions thus extends, in respect to its projection view, in a mirrored symmetry to the right and left of the common plane. For this reason, the holding devices achieve an advantageous stability and excellent oscillation characteristics, through which oscillation disturbances are damped or prevented between the measuring tubes brought together into one oscillation unit.

Preferably, the body of a holding device is in mirrored symmetry to the common plane in its entire length in the direction of the measuring tube central axes, however it is possible that there are minimal deviations in respect to the symmetry, in particular, at the attachment extensions, which are caused by the receiving areas for attaching the sensor or actuator devices, but do not influence the oscillation characteristics of the holding device.

In order to further increase the stability of the holding device, it is provided by a first further development of the Coriolis mass flowmeter that the holding device is formed integrally with the attachment extensions, in particular of one single raw part. The holding devices together with the attachment extensions are preferably worked out of one single raw part, e.g., milled, which has the advantage opposed to multipart or welded holding devices that a more exact dimensional stability can be implemented, and in particular, no material tension can occur due to irregular thermal input. As an alternative to the production from one single raw part, the holding devices with the attachment extensions can also be forged, so that the holding devices with the attachment extensions are produced together by a primary shaping process. Holding devices produced in this manner for joining two measuring tubes into one oscillation unit have an increased stability and reliably prevent that oscillation disturbances of the joined measuring tubes in relation to one another occur.

It has been unexpectedly seen to be of particular advantage when the extension of the holding devices in the direction of the measuring tube central axes is greater than twice the measuring tube wall thickness and less than the measuring tube diameter. The size of the contact surface, inter alia, between the measuring tube and the holding device is defined by this given thickness of the holding device in the direction of the extension of the measuring tube central axes, so that the measuring tube is supported sufficiently by the holding device. The given relation of the extension of the holding device in the direction of the measuring tube central axes to wall thickness of the measuring tube and to the measuring tube diameter determines a defined geometrical moment of inertia, so that, in particular, oscillations of both of the measuring tubes joined into an oscillation unit are damped or prevented.

A particularly advantageous relation between the thickness of holding device and the measuring tube diameter occurs when the extension of the holding device in the direction of the measuring tube central axes is equal to about half of the measuring tube diameter. The material thickness of the holding devices, which corresponds to about the radius of the measuring tube, implements an optimal of the damping characteristics, in particular when the diameter of the measuring tube lies between 30 mm and 45 mm and the measuring tube wall thickness equals between 0.5 mm and 1.5 mm.

For the functional use of a Coriolis mass flowmeter, it is required that a holding device is attached to each of the oscillation units exactly opposite on the oscillation units so that, according to a preferred further development, it is provided that the side flanks of the holding device extend between the measuring tube central axes parallel to the common plane, in particular, the side flanks run parallel to one another. The entire width of the holding device is narrow here, wherein the minimum width is defined by the measuring tube diameter and a remaining minimum wall thickness of the holding device. Bulging of the holding device is prevented by the flanks running parallel to one another, which in particular run parallel to the common plane between the measuring tube central axes, and it is ensured that the oppositely arranged holding devices on the oscillation units do not influence each other, and in particular, do not touch during operation of the Coriolis mass flowmeter.

According to a further design of the Coriolis mass flowmeter, it has been seen to be advantageous if the attachment extensions of the holding devices have a square projection when viewed in the direction of the measuring tube central axes. The essentially square form of the attachment extensions increases the stability of the holding device, in that the holding device is strengthened in the area in which a minimum material thickness would be provided without the attachment extensions. Furthermore, the torsional stiffness of the holding devices is increased by the square attachment extensions.

In order to reduce the weight of the holding device while maintaining the stability, according to a further development, it is provided that the holding devices have a hole between the openings for the measuring tube at each of right and left sides of the common plane, wherein the holes extend parallel to the openings. The total mass of the holding device is reduced by the holes, wherein, however, at the same time, the advantageous stability remains. The holes are preferably provided in the essentially triangular area between the two circular openings for the measuring tube in the holding device. The diameter of the holes is chosen here so that the holes are surrounded by a minimum wall thickness that corresponds to the minimum wall thickness of the holding devices in the area of the openings. Instead of the holes, slots of arbitrary geometry can be provided, which are created with an appropriate method with or without machining. For example, electrical discharge machining or laser cutting are suitable as methods. In the case that the holding device with the attachment extensions is produced using a primary shaping process, the slots can already be provided during production.

In order to guarantee a sufficient stability of the holding device, it is provided according to a design that the minimum wall thickness of the holding device in the area of the openings for the measuring tube, i.e., radial to the measuring tube central axis, corresponds to about 10% of the measuring tube diameter. The minimum width of the holding device is thus about 120% of the measuring tube diameter. The minimum wall thickness is necessary to guarantee a sufficient stability despite the required openings for holding the measuring tubes and to ensure a damping of oscillation disturbances.

A particularly advantageous stiffness of the holding device occurs when, according to a preferred further development, the holding devices with the attachment extensions in their basic form are also designed with a mirror symmetry in respect to a plane that extends orthogonally to the common plane and lies in the middle between the measuring tube central axes of a measuring tube pair. Since the measuring tubes are symmetrically placed in the holding device, the mirror plane of the holding device lies consequently exactly in the middle between the openings for measuring tubes. The holding devices thus extend identically to both sides of the orthogonal plane, wherein it is always provided that an attachment extension is provided on both sides of the orthogonal plane. According to this design, the holding devices are essentially completely symmetrical, which acts advantageously on the damping characteristics and the torsional stiffness of the holding device.

Another further development provides that the holding device with the attachment extensions is made of stainless steel. By using stainless steel, the holding devices become unsusceptible to damage caused by corrosion and possible damage resulting from long-term oscillation stress and causing material fatigue in conventional steel. Additionally, the holding devices of stainless steel are not susceptible to corrosion and onslaught by aggressive media.

The stability of the Coriolis mass flowmeter is increased overall when, according to a further design, two node plates are provided on both sides in the end sections of the measuring tube, that the node plates are designed symmetrically and that the thickness of the node plates corresponds to the extension of the holding device in the direction of the measuring tube central axes. The node plates are arranged in the end sections spaced from one another so that the measuring area of the Coriolis mass flowmeter is defined between the inner node plates provided on both sides. A coupling out of the oscillation onto the piping system surrounding the Coriolis mass flowmeter is reliably prevented and qualitative high-grade measurements are ensured by the two node plates in the end sections. The thickness of the node plates corresponds preferably to the thickness of the holding devices and is thus measured in accordance with the specifications of the holding device. The node plates are preferably produced from one single raw part, in that, for example, four openings for the four measuring tubes are removed from one raw part, the node plate is pushed onto the four measuring tubes and is then joined to them. The node plates are preferably also completely symmetrical to the common plane as well as to the orthogonal plane.

In detail there are a plurality of possibilities for designing and further developing the Coriolis mass flowmeter according to the invention. Here, please refer the following description of preferred embodiments in conjunction with the accompanying drawings.

BRIEF DESCRIPTION OF THE DRAWINGS

FIG. 2 is a front view of the embodiment of a holding device according to FIG. 1, FIG. 3 is a side view of the embodiment of a holding device according to FIG. 1, FIG. 4 is a top view of the embodiment according to FIG. 1.

DETAILED DESCRIPTION OF THE INVENTION

Figure 1:
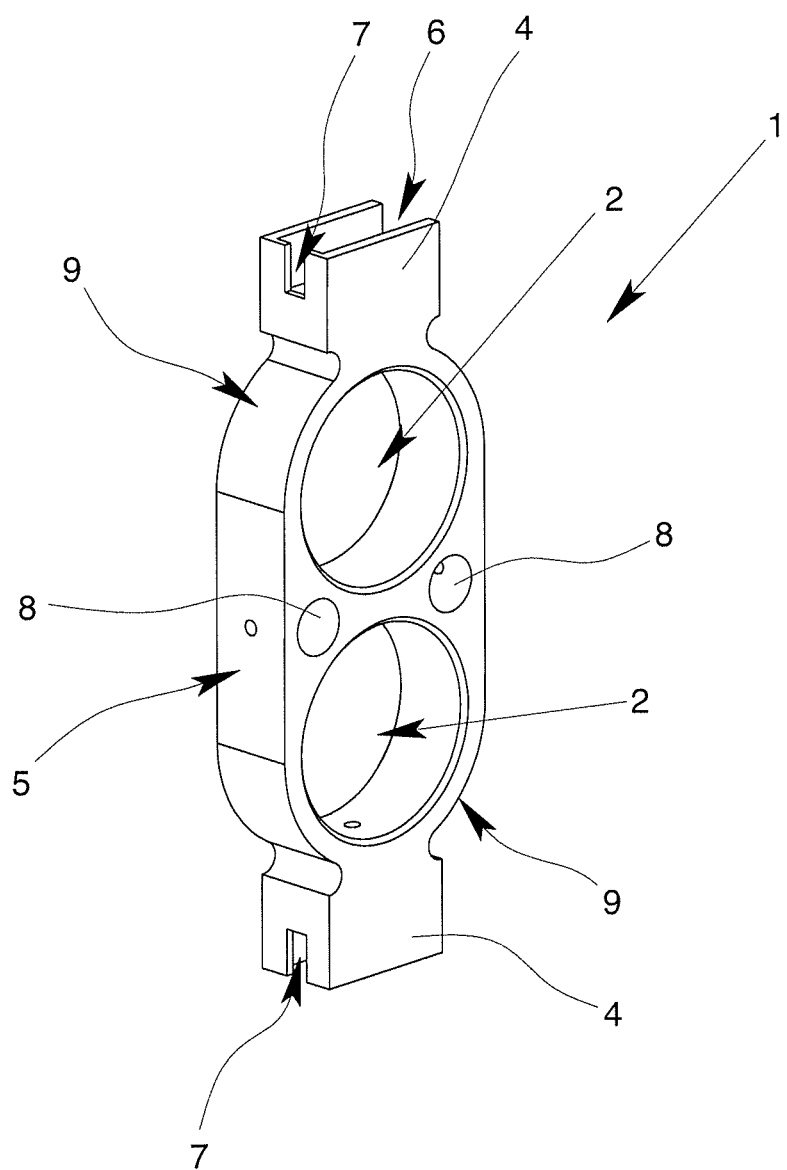
FIG. 1 is a perspective view of an embodiment of a holding device for a Coriolis mass flowmeter.
Figure 5:
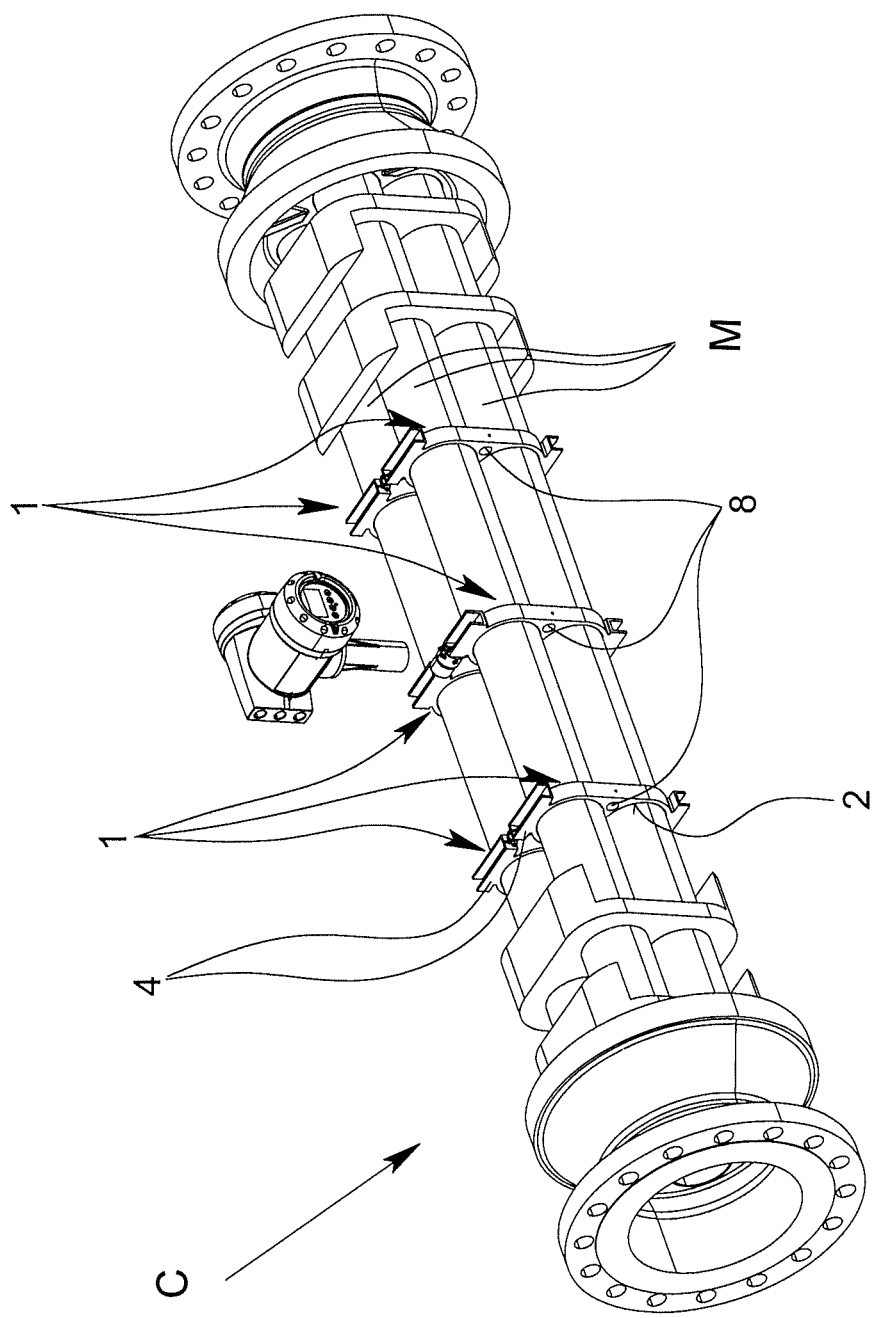
FIG. 5 is a perspective view of a Coriolis mass flowmeter having at least four measuring tubes running in parallel held in holding devices as shown in FIGS. 1-4.

FIG. 1 shows a holding device 1 for a Coriolis mass flowmeter C with four parallel measuring tubes M as shown in FIG. 5. The holding device 1 brings two measuring tubes M together to form an oscillation unit in the mounted state, in that the measuring tube M are coupled to one another via the holding device 1. The holding device 1 has openings 2 in which the measuring tube M are placed for attachment or for the holding devices 1 to be pushed onto the measuring tubes.

FIG. 2 shows the holding device 1 according to FIG. 1 in a front view. The measuring tube central axes 3 of the measuring tubes M lie in a common plane E, which extends perpendicular through the holding device 1 according to FIG. 2. The projection view shown in FIG. 2 of the holding device 1 in the direction of the extension of the measuring tube central axes 3 is symmetrical to plane E, through which advantageous oscillation characteristics result for the holding device 1. The holding device 1 has two attachment extensions 4, which are integrally designed with the holding device 1 in this embodiment, in that the holding device with the attachment extensions 4 is produced from one raw part. The side flanks 5 of the holding device 1 extend parallel to one another as well as parallel to plane E so that a preferred narrow construction of the holding device 1 results.

FIG. 3 shows the holding device 1 according to FIG. 1 in a side view. In this side view, the extension of the holding device 1 in the direction of the measuring tube central axes 3 can be easily seen, which corresponds, here, to about half of the measuring tube diameter. A first slot 6 and a second slot 7 are provided on the attachment extensions 4 for attaching parts of sensor or actuator devices—one of which is shown in FIG. 5 detached from and above one of the extensions 4. The parts of the sensor or actuator devices are attached to the first slot 6, wherein the slot 7 aids in introducing an attachment tool to slot 6. The slots 6, 7 represent the only deviation of the form of the holding device 1 from complete symmetry, but have no influence on the oscillation characteristics; the symmetry of the projection view remains despite the slots 6, 7—see FIG. 2.

FIG. 4 shows a top view of the holding device 1 according to FIG. 1 in which the entire width of the holding device 1 can be seen. The width of the holding device 1 is about 120% of the diameter of the measuring tubes M in this case. The slots 6, 7 are arranged in the upper area on the attachment extensions 4 for attaching the parts of the sensor or actuator device. The flanks 5 extend parallel to one another and also parallel to plane E.

According to FIG. 2, holes 8 are provided for weight reduction in the triangular area created between the openings 2 for the measuring tubes, which extend parallel to the openings 2, wherein, at the same time, the sufficient stability of the massive holding device 1 remains. The minimum wall thickness of the holding device 1 in the area 9 of the openings 2 amounts to about 10% of the measuring tube diameter; here about 10% of the diameter of the openings 2. The holes 8 are also surrounded by a minimum wall thickness, which corresponds to the above-mentioned minimum wall thickness in the area 9 of the openings 2. The attachment extensions 4 have a rectangular shape viewed in the direction of the extension of the measuring tube central axes 3, through which the holding devices 1 are made stiff in the upper and lower sections according to FIG. 2.

The holding device 1 shown in FIGS. 1 to 4 is not only symmetrical to plane E—in respect to its projection view—but also completely to plane B, which extends parallel to the measuring tube central axes 3 and lies in the middle between these—see FIG. 2. The plane B lies exactly on the central axes of the holes 8 in this embodiment. The measuring tube diameter is about 38 mm in this embodiment, wherein the wall thickness of the measuring tube M is about 0.7 mm.

As can be seen in FIG. 1, the holding device 1 is thus completely symmetrical to plane E as well as to plane B—with the exception of the slots 6, 7—through which preferred damping characteristics result that prevent a relative oscillation of the measuring tube M found in the holding device 1 in relation to one another and prevent torsion of the holding device 1 in respect to its longitudinal axis—running perpendicular through the measuring tube central axes 3.

What is claimed is:

1. Coriolis mass flowmeter, comprising:
at least four measuring tubes running parallel to each other,
at least one holding device joining the measuring tubes in pairs into a oscillation unit, the measuring tubes being inserted in openings in the holding device and
at least one of a sensor and an actuator device, at least part of which is attached to the holding device,
wherein measuring tube central axes of a measuring tube pair span a common plane,
wherein the holding device has at least two attachment extensions that extend into the common plane and
the holding devices with the attachment extensions are mirror symmetric with respect to the common plane when viewed as a projection in a direction of the measuring tube central axes.

2. Coriolis mass flowmeter according to claim 1, wherein the attachment extensions are an integral part of the holding device being formed of one piece therewith.

3. Coriolis mass flowmeter according to claim 1, wherein the holding devices have a length in the direction of the measuring tube central axes that is greater than twice a measuring tube wall thickness and less than a measuring tube diameter.

4. Coriolis mass flowmeter according to claim 1, wherein the holding devices have a length in the direction of the measuring tube central axes that is equal to about half a measuring tube diameter.

5. Coriolis mass flowmeter according to claim 1, wherein side flanks of the holding device extend between the measuring tube central axes parallel to the common plane.

6. Coriolis mass flowmeter according to claim 1, wherein the attachment extensions of the holding devices have a rectangular projection viewed in the direction of the measuring tube central axes.

7. Coriolis mass flowmeter according to claim 1, wherein the holding devices have a hole between the openings for the measuring tube at each of right and left sides of the common plane, and wherein the holes extend parallel to the openings.

8. Coriolis mass flowmeter according to claim 1, wherein the minimum wall thickness of the holding device in the area of the openings for the measuring tube radial to the measuring tube central axis is about 10% of the measuring tube diameter.

9. Coriolis mass flowmeter according to claim 1, wherein the holding devices with the attachment extensions are mirror symmetric relative to a plane that extends orthogonally relative to the common plane and lies in the middle between the measuring tube central axes of each measuring tube pair.

10. Coriolis mass flowmeter according to claim 1, wherein the holding device, including the attachment extensions, is made of a stainless steel.

11. Coriolis mass flowmeter according to claim 1, wherein a pair of node plates is provided on each side in the end sections of the measuring tube, the node plates being symmetric and having a thickness that corresponds to the length of the holding device in the direction of the measuring tube central axes.

* * * * *